United States Patent Office 2,876,223
Patented Mar. 3, 1959

2,876,223

SYNTHESIS OF SUBSTITUTED 1,3 DIAZACYCLO-PENTENES AND 1,3 DIAZACYCLOHEXENES

Barry M. Bloom, Jackson Heights, N. Y., assignor to Chas. Pfizer & Co., Inc., New York, N. Y., a corporation of Delaware No Drawing. Application February 20, 1957
Serial No. 641,253

4 Claims. (Cl. 260—256.4)

This invention is concerned with a process for the preparation of useful organic nitrogen compounds. More particularly, it is concerned with the process for the preparation of substituted and unsubstituted 2-(1',2',3',4'- tetrahydro- 2'- isoquinolyl)- 1,3- diazacyclopentenes, diazacyclohexenes and their acid addition salts.

The free bases and the pharmaceutically acceptable acid addition salts prepared by the process of this invention are useful as regulators of the cardiovascular system as disclosed in copending applications, Serial No. 616,639 and Serial No. 616,594 filed on October 18, 1956. Acid addition salts prepared using the process of this invention and containing pharmaceutically unacceptable acids are useful for isolation of the pharmaceutically active free base and/or for the purification of the pharmaceutically active compounds.

In accordance with the process of this invention, 1,2,3,4-tetrahydroisoquinoline is reacted with a 2-alkylthio or 2-aralkylthio-1,3-diazacyclopentene or -hexene acid addition salt, the resulting alkyl or aralkyl mercaptan removed, if desired, and the useful compound isolated either as an acid addition salt or as a free base. The reaction is illustrated in the following formula:

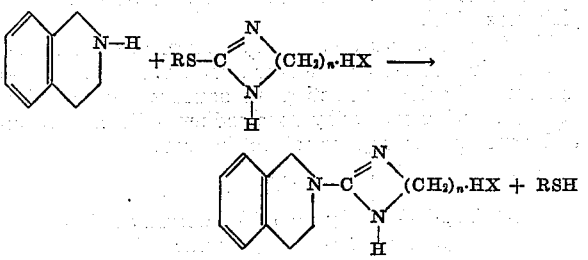

wherein R is preferably an alkyl or aralkyl group containing up to ten carbon atoms, X is an anion of an organic or inorganic acid giving a hydrogen ion concentration of at least $10^{-5}$ moles per liter in aqueous solution, and $n$ is the integer two or three.

As stated above R is preferably an alkyl or aralkyl group. Most satisfactory results are obtained when R is an alkyl or aralkyl group which produces a volatile mercaptan, e. g. methyl, as the by-product of the reaction. It is not necessary to remove the mercaptan, but if it is desired to do so it can be readily accomplished. Volatile mercaptans simply go off as a vapor during the course of the reaction. Non-volatile mercaptans can be removed by extraction of the reaction mixture with lead acetate solution.

The process of this invention is applicable to 1,2,3,4-tetrahydroisoquinolines in which carbon atoms are substituted with alkyl, alkoxy, phenyl thioalkyl, hydroxyl, mercapto, halogen, cyano, carbonyl, acylamino and other groups. It is, however, best to avoid strongly acid substituents particularly those which give tetrahydroisoquinolines having a hydrogen ion concentration of $10^{-3}$ moles per liter or higher in aqueous solutions, e. g., the sulfonic or phosphonic acid groups. The carbon atoms of a 1,3-diazacycloalkene can also be substituted with groups such as those listed above, but a carbon atom adjacent to a nitrogen atom should not be substituted with an hydroxyl group nor should any diazacycloalkene be substituted with a group giving a diazacycloalkene free base which, when dissolved in water, gives a hydrogen ion concentration greater than $10^{-3}$ moles per liter.

For the preparation of preferred compounds useful as regulators of the cardiovascular system, the aromatic ring of the tetrahydroisoquinoline compound may be unsubstituted or substituted with chlorine, bromine or iodine, hydroxyl, alkyl or alkoxy groups containing up to four carbon atoms. The partially reduced ring may be unsubstituted or substituted with alkyl groups containing up to four carbon atoms. The number four or five carbon atoms of the diazacyclopentene ring may be unsubstituted or substituted with alkyl groups containing up to four carbon atoms as may be the number four, five and six carbon atoms of the diazacyclohexene ring. In addition, the number five carbon atom of the diazacyclohexene ring may also be substituted with an hydroxyl group.

It is apparent, therefore, that the tetrahydroisoquinolines of this invention can be defined as 1,2,3,4-tetrahydroisoquinolines free of acid substituents giving rise to 1,2,3,4-tetrahydroisoquinolines having a hydrogen ion concentration greater than $10^{-3}$ moles per liter in aqueous solution. The diazacycloalkenes can be defined as acid addition salts of 2-alkylthio or 2-aralkylthio-1,3-diazacyclopentenes or -hexenes free of substituents giving rise to diazacycloalkene free bases having a hydrogen ion concentration greater than $10^{-3}$ moles per liter in aqueous solution, the carbon atoms of said diazacycloalkenes being free of hydroxyl groups when adjacent to a nitrogen atom, the alkyl or aralkyl groups of said diazacycloalkenes containing up to ten carbon atoms.

In accordance with the process of this invention, substantially equimolar portions of the selected tetrahydroisoquinoline and diazacycloalkene acid addition salts are reacted in a solvent such as a lower alkanol containing up to six carbon atoms, or a ketone containing up to six carbon atoms. Examples of suitable solvents include methanol, ethanol, hexanol, acetone, methyl isopropyl ketone and methyl isobutyl ketone. There is no chemical advantage in using an excess of either reactant and it is not necessary to do so.

The temperature and time of the reaction are not critical but optimum yields are generally obtained if the reaction mixture is maintained at from about 50 to 150° C. for a period of about fifteen minutes to three hours. It is generally most convenient to select a solvent whose reflux temperature is between the optimum temperature limits and to reflux the reaction mixture for about one hour. During the reflux period the desired product forms as an acid addition salt and occasionally precipitates from the solvent. Precipitation can be enhanced by cooling, for example, in an ice bath, or by the addition of ether.

If a therapeutically active free base of an acid addition salt prepared as described above is desired, the acid addition salt can readily be converted to the free base by treatment with an alkaline reagent. For example, the acid addition salt can be dissolved in water and the solution neutralized or preferably made alkaline with base, or the acid addition salt can be taken up in an equivalent amount or preferably an excess of aqueous base. In any case, the active free base can be isolated from aqueous solution by extraction with a suitable solvent preferably a hydrocarbon or halogenated hydrocarbon solvent containing up to seven carbon atoms such as chloroform, benzene, toluene, hexane, carbon tetrachloride or methylene chloride. Evaporation of the solvent, preferably after drying over an anhydrous drying agent such as sodium sulfate, leaves the desired product as a residue. Suitable alkaline reagents which can be employed in preparing a free base of this invention include the oxides, hydroxides, carbonates and bicarbonates of the alkali metals and alkaline earth metals such as sodium hydroxide, potassium carbonate, barium hydroxide and calcium hydroxide.

The yields obtained in practicing the invention in accordance with the description given above were generally of the order of 80 to 90%. However, attempts to employ the process of the invention in the preparation of tetrahydroquinoline compounds, that is, to isomers of tetrahydroisoquinoline were unsuccessful.

The following examples are given by way of illustration only and are not to be construed as limitations of the invention, many apparent variations of which are possible without departing from the spirit or scope thereof.

EXAMPLE I 2-(1',2',3',4'-tetrahydro-2'-isoquinolyl)-1,3-diazacyclopentene hydrochloride The compound 2-methylthio-1,3-diazacyclopentene hydrochloride was prepared by suspending 1,3-diazacyclopentane-2-thione in methanol and bubbling in a large excess of methyl chloride while agitating the suspension. The treatment with methyl chloride was continued intermittently over a period of three days during which time the 1,3-diazacyclopentane-2-thione dissolves. The reaction is carried out at room temperature and at the end of three days the solvent is removed in vacuo to give the desired product; M. P. 171 to 172.6° C.

A mixture of 0.1 mole of the hydrochloride prepared as described above and 0.1 mole of 1,2,3,4-tetrahydroisoquinoline in 150 cc. of methanol was refluxed for one hour. The resulting mixture was cooled in an ice bath and the hydrochloride which precipitated recovered by filtration. It was washed with cold methanol and dried; M. P. 172.8 to 173.6° C. The yield was 88%. An analytical sample was prepared by recrystallization from methanol.

Analysis.—Calcd. for $C_{12}H_{16}N_3Cl$: C, 60,62; H, 6.78; N 17.68; Cl, 14.92. Found: C, 60.10; H, 6.84; N, 18.28; Cl, 15.2.

EXAMPLE II 2-(1',2',3',4'-tetrahydro-2'-isoquinolyl)-1,3-diazacyclopentene

A mixture of 0.1 mole of 2-methylthio-1,3-diazacyclopentene hydriodide and 0.1 mole of 1,2,3,4-tetrahydroisoquinoline in 150 cc. of methanol was refluxed for one hour. The resulting mixture was cooled in an ice bath and the hydriodide which precipitated recovered by filtration. It was washed with cold methanol and dried; M. P. 186 to 188° C. The yield was 85%. An analytical sample was prepared by recrystallization from ethanol.

Analysis.—Calcd. for $C_{12}H_{16}N_3I$: C, 43.79; H, 4.90; I, 38.55. Found: C, 44.06; H, 4.79; I, 38.73.

The free base was obtained by neutralizing an aqueous solution of the hydriodide with aqueous potassium carbonate, extracting the aqueous solution with methylene chloride and removing the organic solvent in vacuo; M. P. 126 to 127° C.

EXAMPLE III 2-(6',7'-dimethoxy-1',2',3',4'-tetrahydro-2'-isoquinolyl)-1,3-diazacyclopentene hydrobromide A mixture of 0.1 mole of 2-methylthio-1,3-diazacyclopentene hydrobromide and 0.1 mole of 6,7-dimethoxy-1,2,3,4-tetrahydroisoquinoline in 150 cc. of methanol was refluxed for one hour. The resulting mixture was cooled in an ice bath and the hydrobromide recovered by filtration. It was washed with cold methanol and dried; M. P. 261.4 to 262.0° C. The yield was 87%. The analytical sample was prepared by recrystallization from methanol.

Analysis.—Calcd. for $C_{14}H_{20}O_2N_3Br$: C, 49.1; H, 5.89; N, 12.3. Found: C, 48.9; H, 5.87; N, 12.4.

EXAMPLE IV 2-(3'-phenyl-6'-methoxy-1',2',3',4'-tetrahydro-2'-isoquinolyl)-1,3-diazacyclohexene A mixture of 0.1 mole of 2-methylthio-1,3-diazacyclohexene hydriodide and 0.12 mole of 3-phenyl-6-methoxy-1,2,3,4-tetrahydroisoquinoline in 100 cc. of acetone was refluxed for two hours. The resulting mixture was cooled in an ice bath, treated with 50 cc. of ether and the hydriodide recovered by filtration. The yield of dry product was 90%. The free base was obtained by treating an aqueous solution of the hydriodide with aqueous sodium hydroxide, extracting the aqueous solution with benzene, drying the benzene solution over anhydrous sodium sulfate, filtering and removing the organic solvent in vacuo.

EXAMPLE V 2-(1'-methyl-6',7'-dihydroxy-1',2',3',4'-tetrahydro-2'-isoquinolyl)-1,3-diazacyclohexene hydrochloride A mixture of 0.1 mole of 2-benzylthio-1,3-diazacyclohexene hydrochloride and 0.1 mole of 1-methyl-6,7-dihydroxy-1,2,3,4-tetrahydroisoquinoline in 150 cc. of hexanol was maintained at a temperature of 125° for two hours. The resulting mixture is cooled in an ice bath and the hydrochloride recovered by filtration. The yield of dry product was 91%.

EXAMPLE VI 2-(1'-phenyl-6',7'-dimethoxy-1',2',3',4'-tetrahydro-2'-isoquinolyl)-4-methyl-1,3-diazacyclopentene A mixture of 0.1 mole of 2-propylthio-4-methyl-1,3-diazacyclopentene nitrate and 0.1 mole of 1-phenyl-6,7-dimethoxy-1,2,3,4-tetrahydroisoquinoline in 100 cc. of methyl isobutyl ketone was refluxed for fifteen minutes. The resulting mixture was cooled in an ice bath and the nitric acid addition salt recovered by filtration. The yield was 87%.

The free base was obtained by neutralizing the aqueous solution of the acid addition salt with aqueous potassium hydroxide, extracting the aqueous solution with benzene, drying over anhydrous sodium sulfate, filtering and removing the organic solvent in vacuo.

EXAMPLE VII 2-(1',2',3',4'-tetrahydro-6',7'-dimethoxy-2'-isoquinolyl)-1,3-diazacyclohexene-2

A mixture of 0.1 mole of 2-butylthio-1,3-diazacyclohexene hydrobromide and 0.1 mole of 6,7-dimethoxy-1,2,3,4-tetrahydroisoquinoline in 150 cc. of ethanol was refluxed for thirty minutes. The resulting mixture was cooled in an ice bath and the hydrobromide recovered by filtration. It was washed with cold methanol and dried.

The free base was obtained by neutralizing the aqueous solution of the acid addition salt with aqueous sodium hydroxide, extracting the aqueous solution with benzene, drying over anhydrous sodium sulfate, filtering and removing the organic solvent in vacuo.

EXAMPLE VIII 2-(1',2',3',4'-tetrahydro-2'-isoquinolyl)-1,3-diazacyclohexene-2

A mixture of 0.1 mole of 2-benzylthio-1,3-diazacyclohexene nitrate and 0.1 mole of 1,2,3,4-tetrahydroisoquinoline in 150 cc. of methanol was refluxed for two hours. The resulting mixture is cooled in an ice bath and the nitrate recovered by filtration.

The free base was obtained by neutralizing an aqueous solution of the acid addition salt with aqueous potassium carbonate, extracting the aqueous solution with hexane, drying over anhydrous sodium sulfate, filtering and removing the organic solvent in vacuo.

EXAMPLE IX 2-(1',2',3',4'-tetrahydro-6'-chloro-2-isoquinolyl)-1,3-diazacyclohexene-2 hydriodide A mixture of 0.1 mole of 2-methylthio-1,3-diazacyclohexene hydriodide and 0.1 mole of 6-chloro-1,2,3,4-tetrahydroisoquinoline in 100 cc. of methyl ethyl ketone was refluxed for one hour. The resulting mixture is cooled and treated with ether to precipitate the desired hydriodide.

EXAMPLE X 2-(1',2',3',4'-tetrahydro-6'-methoxy-2'-isoquinolyl)-1,3-diazacyclohexene hydrobromide A mixture of 0.1 mole of 2-methylthio-1,3-diazacyclohexene hydrobromide and 0.1 mole of 6-methoxy-1,2,3,4-tetrahydroisoquinoline in 150 cc. of ethanol was refluxed for thirty minutes. The resulting mixture is cooled in an ice bath and the hydrobromide recovered by filtration.

EXAMPLE XI 2-(1',2',3',4'-tetrahydro-2'-isoquinolyl)-4,5,6-triethyl-1,3-diazacyclohexene-2 hydrochloride A mixture of 0.1 mole of 2-methylthio-4,5,6-triethyl-1,3-diazacyclohexene hydrochloride and 0.1 mole of 1,2,3,4-tetrahydroisoquinoline in 150 cc. of methanol was refluxed for three hours. The resulting mixture is cooled in an ice bath and the hydrochloride recovered by filtration.

EXAMPLE XII 2-(1',2',3',4'-tetrahydro-3'-ethyl-2'-isoquinolyl)-1,3-diazacyclohexene-2 hydrobromide A mixture of 0.1 mole of 2-methylthio-1,3-diazacyclohexene hydrobromide and 0.1 mole of 3-ethyl-1,2,3,4-tetrahydroisoquinoline in 150 cc. of methanol was refluxed for one hour. The resulting mixture is cooled in an ice bath and the hydrobromide recovered by filtration.

EXAMPLE XIII 2-(1',2',3',4'-tetrahydro-3'-butyl-2'-isoquinolyl)-1,3-diazacyclohexene-2 hydrochloride A mixture of 0.1 mole of 2-propylthio-1,3-diazacyclohexene hydrochloride and 0.1 mole of 3-butyl-1,2,3,4-tetrahydroisoquinoline in 150 cc. of ethanol was refluxed for one hour. The resulting mixture is cooled in an ice bath and the desired hydrochloride precipitated by the addition of ether and is recovered by filtration.

EXAMPLE XIV 2-(1',2',3',4'-tetrahydro-2'-isoquinolyl)-5-hydroxy-1,3-diazacyclohexene-2 sulfate A mixture of 0.1 mole of 2-methylthio-5-hydroxy-1,3-diazacyclohexene sulfate and 0.1 mole of 1,2,3,4-tetrahydroisoquinoline in 100 cc. of ethanol was refluxed for three hours. The resulting mixture is cooled in an ice bath and the sulfate recovered by filtration.

EXAMPLE XV 2-(1',2',3',4'-tetrahydro-6'-butoxy-2'-isoquinolyl)-1,3-diazacyclohexene-2 hydrochloride A mixture of 0.1 mole of 2-methylthio-1,3-diazacyclohexene hydrochloride and 0.1 mole of 6-butoxy-1,2,3,4-tetrahydroisoquinoline in 100 cc. of ethyl isopropyl ketone was maintained at a temperature of 75° for three hours. The resulting mixture is cooled in an ice bath and the hydrochloride recovered by filtration.

EXAMPLE XVI 2-(1',2',3',4'-tetrahydro-2'-isoquinolyl)-4-butyl-1,3-diazacyclopentene-2 hydriodide A mixture of 0.1 mole of 2-methylthio-4-butyl-1,3-diazacyclopentene hydriodide and 0.1 mole of 1,2,3,4-tetrahydroisoquinoline in 150 cc. of methyl isobutyl ketone was refluxed for fifteen minutes. The resulting mixture was cooled in an ice bath and the hydriodide recovered by filtration.

EXAMPLE XVII 2-(1',2',3',4'-tetrahydro-2'-isoquinolyl)-5-butyl-1,3-diazacyclohexene-2 nitrate A mixture of 0.1 mole of 2-methylthio-5-butyl-1,3-diazacyclohexene nitrate and 0.1 mole of 1,2,3,4-tetrahydroisoquinoline in 150 cc. of pentanol was maintained at a temperature of 65° for two hours. The resulting mixture is cooled in an ice bath and the nitrate recovered by filtration.

EXAMPLE XVIII 2-(1',2',3',4'-tetrahydro-3'-butyl-2'-isoquinolyl)-1,3-diazacyclopentene-2 hydrobromide A mixture of 0.1 mole of 2-methylthio-1,3-diazacylopentene hydrobromide and 0.1 mole of 3-butyl-1,2,3,4-tetrahydroisoquinoline in 150 cc. of ethanol was refluxed for one hour. The resulting mixture is cooled and the hydrobromide recovered by filtration.

EXAMPLE XIX 2-(-1',2',3',4'-tetrahydro-6',7'-dibromo-2'-isoquinolyl)-1,3-diazacyclopentene-2 sulfate A mixture of 0.1 mole of 2-methylthio-1,3-diazacyclopentene sulfate and 0.1 mole of 6,7-dibromo-1,2,3,4-tetrahydroisoquinoline in 150 cc. of methanol was refluxed for three hours. The resulting mixture is cooled in an ice bath and the desired product precipitated by the addition of ether.

EXAMPLE XX 2-(1',2',3',4'-tetrahydro-6'-iodo-2'-isoquinolyl)-1,3-diazacyclopentene-2 hydriodide A mixture of 0.1 mole of 2-methylthio-1,3-diazacyclopentene hydrochloride and 0.1 mole of 6-iodo-1,2,3,4-tetrahydroisoquinoline in 150 cc. of ethanol was refluxed for one hour. The resulting mixture is cooled in an ice bath and the hydriodide recovered by filtration.

EXAMPLE XXI 2-(1',2',3',4'-tetrahydro-6',7'-dichloro-2'-isoquinolyl)-1,3-diazacyclopentene-2 acetate 9 mixture of 0.1 mole of 2-methylthio-1,3-diazacyclopentene acetate and 0.1 mole of 6,7-dichloro-1,2,3,4,-tetrahydroisoquinoline in 150 cc. of acetone was refluxed for three hours. The resulting mixture is cooled in an ice bath and the acetate recovered by filtration.

EXAMPLE XXII 2-(1',2',3',4'-tetrahydro-6'-chloro-2'-isoquinolyl)-5-ethyl-1,3-diazacyclohexene butyrate A mixture of 0.1 mole of 2-methylthio-5-ethyl-1,3-diazacyclopentene butyrate and 0.1 mole of 6-chloro-1,2,3,4-tetrahydroisoquinoline in 100 cc. of methyl ethyl ketone was refluxed for two hours. The resulting mixture is cooled in an ice bath and the butyrate recovered by filtration.

What is claimed is:
1. The process which comprises reacting a compound of the formula

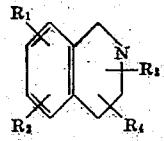

wherein each of $R_1$, $R_2$, $R_3$, and $R_4$ are selected from the group consisting of hydrogen, alkyl, alkoxy, phenyl, thioalkyl, hydroxyl, mercapto, halogen and cyano with a compound of the formula

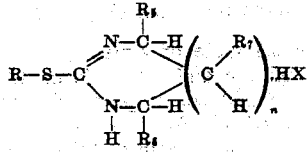

wherein R is selected from the group consisting of alkyl and aralkyl containing up to 10 carbon atoms, $R_5$ and $R_6$ are each selected from the group consisting of hydrogen and alkyl containing up to 4 carbon atoms, $R_7$ is selected from the group consisting of hydrogen, alkyl containing up to 4 carbon atoms and hydroxy, $n$ is an integer from 0 to 1 and X is an anion of an acid selected from the group consisting of inorganic acids having a hydrogen ion concentration of at least $10^{-5}$ mols/liter in an aqueous solution, acetic acid and butyric acid in the presence of a solvent selected from the group consisting of alkanols and ketones containing up to 6 carbon atoms.

2. The process of claim 1 wherein the reaction time is from 15 minutes to 3 hours.

3. The process of claim 1 wherein the reaction temperature is from 50 to 150° C.

4. The process of claim 1 wherein R is methyl.

References Cited in the file of this patent
UNITED STATES PATENTS
1,912,849 Kranzlein June 6, 1933